United States Patent
Westgate et al.

(10) Patent No.: US 6,267,165 B1
(45) Date of Patent: Jul. 31, 2001

(54) PNEUMATIC TIRE WITH SPECIFIED ARAMID BELT

(75) Inventors: Walter Kevin Westgate, Uniontown; Charles Elmer Hamiel, Stow; Robert John Boehlefeld, Broadview Heights, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/100,540

(22) Filed: Jun. 19, 1998

(51) Int. Cl.[7] ............................... B60C 3/04; B60C 9/20; B60C 9/26

(52) U.S. Cl. .................. 152/454; 152/526; 152/527; 152/528; 152/538

(58) Field of Search ................................. 152/528, 527, 152/526, 454, 538

(56) References Cited

U.S. PATENT DOCUMENTS 5,355,922 * 10/1994 Kogure et al. ................... 152/528 X

* cited by examiner

Primary Examiner—Adrienne C. Johnstone
(74) Attorney, Agent, or Firm—David E Wheeler

(57) ABSTRACT

The belts of the reinforcing structure of a pneumatic tire are reinforced with high strength, light weight aramid cords having a linear density of 420 to 1100 dTex, the cords having a twist of 315 to 551 TPM (8 to 14 TPI). In alternative embodiments, overlay material may be incorporated into the belt reinforcing structure. An illustrated embodiment of the tire has a belt reinforcing structure comprising a folded belt folded around a cut belt.

4 Claims, 2 Drawing Sheets

PNEUMATIC TIRE WITH SPECIFIED ARAMID BELT

TECHNICAL FIELD

The present invention relates to pneumatic automobile tires, for use on paved surfaces, comprising a radial ply carcass, a tread disposed radially outwardly of the crown region of the carcass, and a belt assembly interposed between the tread portion and the crown region of the carcass in circumferential surrounding relation to the carcass. The invention relates more specifically to low aspect ratio tires.

BACKGROUND ART

Belt assemblies including a folded ply are well known in the art. In one prior art embodiment the folded ply is reinforced with cords of high modulus material and has an overall width at least equal to that of the tread. Each of its lateral sides is folded back in a radially outward direction, around two unfolded so-called single cut plies. The reinforcing cords of the folded ply form an angle of 20 to 60 degrees, and those of the two single cut plies form opposed angles, respectively of 15 to 28 and minus 15 to 28 degrees, all with respect to the equatorial plane of the tire. Tires comprising folded plies in their crown region have been found to be particularly durable when subjected to high revolution speeds. They have also improved resistance to separations at the axial edges of a belt assembly.

Because of material limitations, early prior art tire constructions tended to be robust, i.e. the tires were heavy and many components were used to provide reinforcement in specific locations in the tire. Such constructions tend to have a high rolling resistance, which lowers fuel economy, and the bulk of the construction had a tendency to limit handling response, and the materials cost was high because of the quantities of materials used.

It is a continuing goal in the art, to find new, lightweight and high strength materials, and to find suitable uses for such materials in tires, such that the weight of tires can be reduced while other properties are maintained In the development of the present invention, the inventors noticed that experimental reinforcement material they evaluated had an excellent fatigue resistance. This property made the material suitable for application of a relatively low twist to the cord, which made it possible to maintain durability and elongation characteristics in a lower density material. These properties are necessary for reinforcement used in the belt of a tire. Having noticed that handling properties of a tire improved when reinforcement cords in a belt were reduced from 1670 dTex to 1100 dTex, the inventors speculated that further reduction of the linear density of the reinforcement cords would further improve handling. In the tires constructed, the weight of the tire was reduced, and handling and high-speed properties (as illustrated by lap speeds) were improved.

Other objects of the invention will be apparent from the following description and claims.

PRIOR ART

EP 237,599 teaches polyaromatic amide fiber cords reinforcing a belt, which is folded over a cut, carbon fiber cord reinforced belt.

U.S. Pat. No. 4,644,988 teaches a folded glass belt structure in a tire.

Oare et al, in U.S. Pat. No. 5,115,853, and references cited therein, teach the use of overlays in tires. The references teach various materials that can be used, and various gauges of such materials that are used in building tires, as well as various tire constructions.

Breny, in U.S. Pat. No. 5,437,321 teaches a high performance tire where an overlay is used in place of a cut belt, and a folded belt is folded over edges of the overlay.

Roesgen et al. in U.S. Pat. No. 5,332,018 teach a tire construction using a folded belt structure which comprises a folded belt, a cut belt, and an overlay, having some embodiments wherein the overlay is located between the folded edges of a folded belt.

Hubbell et al, in U.S. Pat. No. 5,323,829 teach a high performance tire having a folded belt structure wherein one embodiment comprises a folded belt folded over the edges of a cut belt, and an overlay covering the full width of a folded belt, including the folded over edges.

EP-A-92 498 discloses a first tread reinforcing ply folded around a second tread reinforcing ply, such that the first ply envelops the second ply. The reinforcing cords of the first ply form an angle of 20 to 60 degrees and those of the second ply form an angle of 0 to 10 degrees with respect to the equatorial plane of the tire. EP-A-412 928 discloses a textile overlay structure which is reinforced with cords made of aramid; the cords have a twist multiplier (as defined here below) between 6 and 14 and at least one of the yarns included in the cords has a twist of at least 14 turns per inch (TPI) (551 turns per meter (TPM)).

LU 85 964 describes a tire having an overlay structure disposed radially outwardly of the belt assembly. Helical convolutions of a ribbon are wound axially across two single cut plies such that the convolutions are in abutting contact with each other. The ribbon is reinforced with cords of textile material. An overlay structure wherein the helical convolutions overlap is for instance disclosed in EP 333 628.

DISCLOSURE OF INVENTION

The present invention provides a pneumatic automobile tire having an aspect ratio below 65, comprising at least one radial ply carcass, a tread disposed radially outward of the crown region of the carcass, and a belt assembly having an overall width substantially equal to the tread width (TW) interposed between the tread and the crown region in circumferential surrounding relation to the carcass. The belts are reinforced with 420 to 1100 dTex aramid cords, wherein the cords have a toughness as measured in MPa of 30 to 50, an initial modulus as measured in MPa of 15,000 to 40,000, a tenacity as measured in cN/Tex of 140 to 200 and a dynamic flex fatigue (ASTM, Scott's flex tester) retained break strength of 50 to 100%. The belts used in the belt assembly are reinforced with reinforcement cords extending parallel to one another and making an angle of 10° to 40° with respect to the equatorial plane (EP) of the tire. In an illustrated embodiment, the belt assembly comprises a folded belt having folded portions on each lateral side folded radially over a cut belt. The axially outer portions of the folded belt are folded in a radially outward direction, and are disposed radially outward of the cut belt.

In alternative embodiments, an overlay or a spirally wound overlay may be used in the tire construction. The overlay may be made from elastomeric material reinforced by textile cords and may form at least one annular layer; the cords making an angle of 0° to 5° with respect to the equatorial plane (EP) of the tire.

Also provided is a treated aramid cord, which is prepared to be used as a tire reinforcement.

DEFINITIONS

"Belt" refers to plies of parallel cords, woven or unwoven, underlying the tread, unanchored to the bead, and having cord angles of from 17 to 27 degrees with respect to the equatorial plane of the tire.

"Cut belt ply" refers to a belt having a width less than the tread width, which lies flat over the carcass plies in the crown area of the tire.

"Crown" refers to that portion of the tire within the width limits of the tire tread, in the area of the tire tread.

"Carcass ply" refers to plies of parallel cords anchored to both beads of the tire.

"Overlay" refers to fabric or fiber reinforced rubber having a width substantially equivalent to the tread width which is placed over the belt structure in a tire to minimize delamination at the belt edges and to provide a smoother ride.

"High Performance Automobile" refers to stockcars that are designed for high speed such as Corvettes, Lamborghini, Ferrari, Porsche, etc.

DETAILED DESCRIPTION OF THE INVENTION

Figure 1:
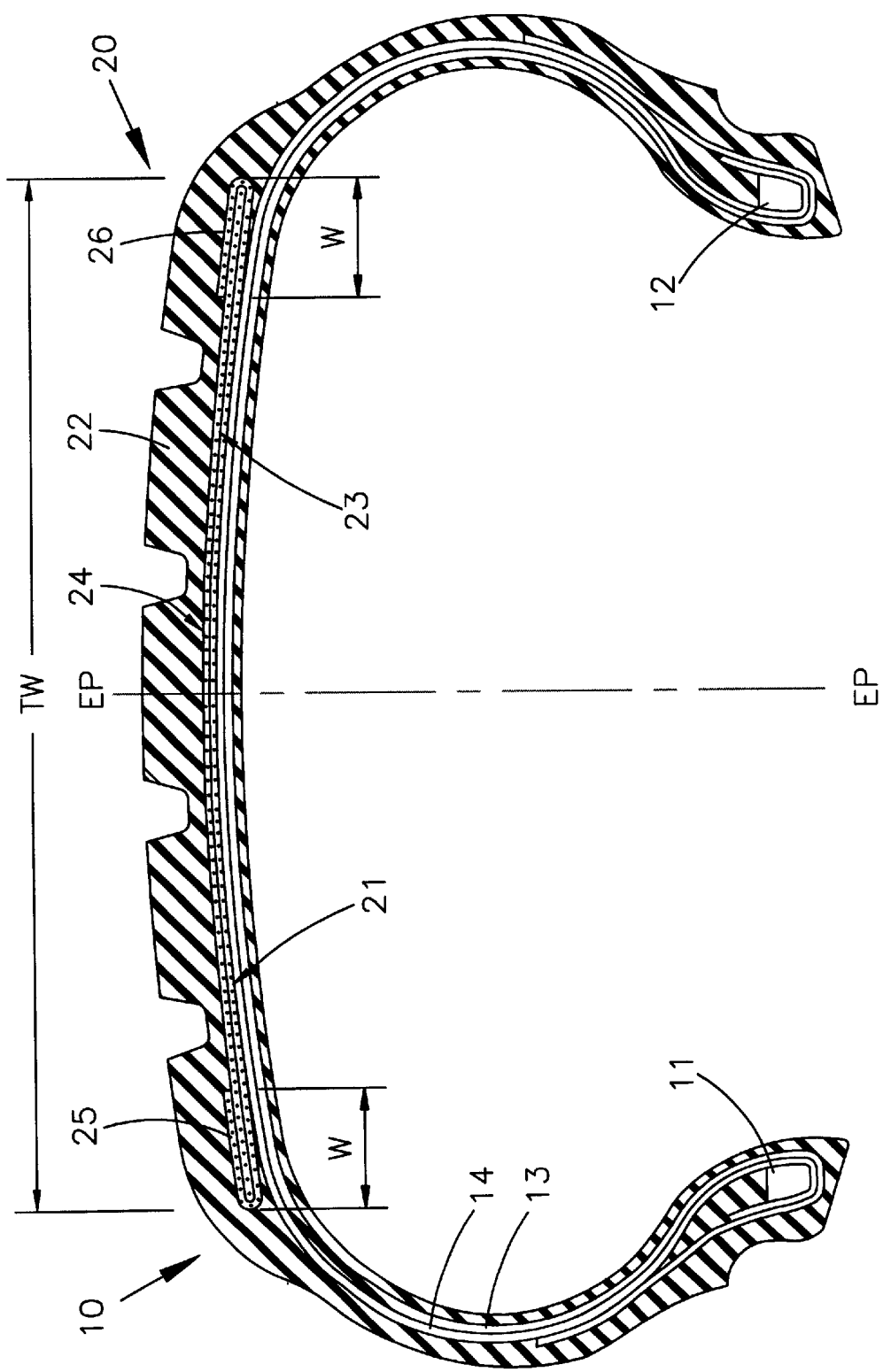
FIG. 1 is a cross-sectional view of a pneumatic tire made in accordance with the present invention.

With reference to FIG. 1, there is represented a low aspect ratio radial carcass pneumatic automobile tire 10 having a pair of substantially inextensible bead cores 11,12 which are axially spaced apart with two radial carcass plies 13,14 extending between the bead cores. The carcass plies are folded axially and radially outwardly about each of the bead cores and are reinforced by cords which are substantially parallel to each other in the same ply, and make an angle of 50° to 90° with respect to the equatorial plane (EP) of the tire. Cords belonging to adjacent carcass plies generally have opposite angles, and cross each other at an angle of at least 1 degree, and preferably an angle of 2 to 5 degrees. The cords of the carcass plies 13,14 can be of any suitable material, as for example steel, nylon, rayon, aramid or polyester.

In an illustrated embodiment, the aspect ratio of tire 10 is 25 to 65 and is preferably 25–60.

As used herein and in the claims, the "equatorial plane" of the tire (EP) is a plane that is perpendicular to the axis of rotation of the tire and passes through the center of the tire tread, the terms "axial" and "axially" refer to lines or directions which are parallel to the axis of rotation of the tire and the terms "radial" and "radially" refer to directions that are radially toward or away from the axis of rotation of the tire. "Tread width" TW of the tire means the length of the tread surface in the axial direction, that is, in a plane passing through the axis of rotation of the tire. "Aspect ratio" of the tire means the ratio of its section height, i.e. the radial distance from the nominal rim diameter to the maximum outer diameter of the tire nearest its equatorial plane to its section width, i.e. the maximum axial distance between the exterior of the tire sidewalls when unloaded and inflated at normal pressure, multiplied by 100% for expression as a percentage. By low aspect ratio is meant a tire having an aspect ratio of 65 and below.

In an illustrated embodiment, as is illustrated in FIG. 1, the tire 10 comprises carcass plies 13,14 of side-by-side polyester or rayon cables, and the crown area 20 of the tire 10 is reinforced by a belt assembly 21 located radially inwardly of the tire tread 22. The belt assembly is essentially rigid and comprises a folded belt 23 and a cut belt 24 disposed radially outwardly of the folded belt. Both belts are reinforced with aramid cables or yarns.

As used herein, "aramid" and "aromatic polyamide" are both understood to mean a manufactured fiber in which the fiber-forming substance is generally recognized as a long chain synthetic aromatic polyamide in which at least 85% of the amide linkages are attached directly to the two aromatic rings. Representative of an aramid or aromatic polyamide is a poly (p-phenyleneterephthalamide).

Cords used as reinforcement in a tire are generally treated (coated) with one or more layers of adhesive in a process known as dipping.

The modulus of a treated cord is, inter alia, a function of the twist of the different yarns used in the cord, the cord twist, and the manner that the cord is subjected to the dipping operation.

High modulus materials, e.g. aramid, have potential advantages in high speed tires in view of their dimensional stability, but because of their dimensional stability, such cords must be twisted, to improve the durability of the cords, and so that the finished cord has the expansion potential required to match the expansion that a tire goes through during shaping and vulcanizing.

Referring again to FIG. 1, the cords of the folded belt 23 are substantially parallel to each other and make an angle of 15° to 40° with respect to the equatorial plane (EP) of the tire. The axially outer portions of the folded belt 23 are folded back on both lateral sides in a radially outward direction over the cut belt 24, the folded portions 25 and 26 being illustrated as symmetrical with respect to the equatorial plane. The folded portions 25 and 26 may each have a transverse width equal to 5% to 30%, preferably 15% to 30% of the tread width (TW).

Figure 2:
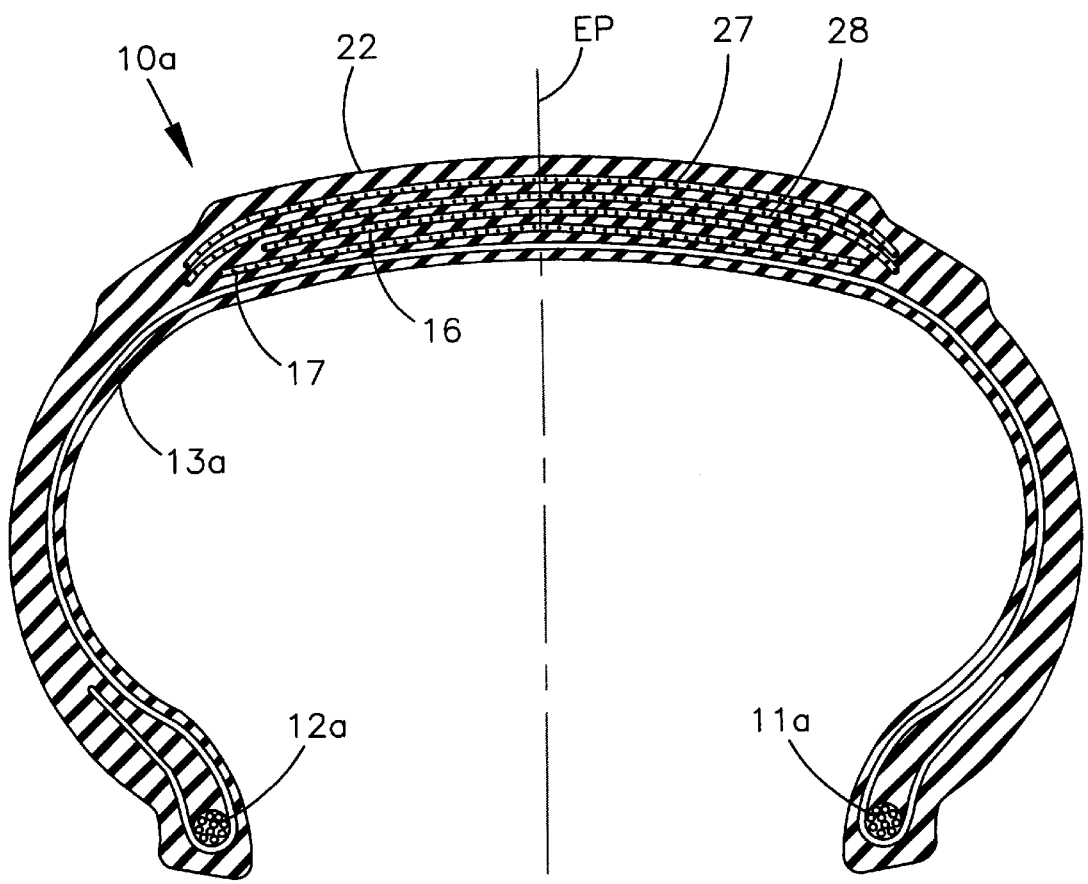
FIG. 2 is a cross sectional view of a tire with an alternative crown area reinforcement.

With reference now to FIG. 2, in an alternative embodiment of the invention, tire 10a is made with one carcass ply 13a wrapped around beads 11a,12a. Belts 16 and 17 are reinforced with aramid cords as described herein, and overlays 27 and 28 are disposed radially outward of belts 16 and 17.

The overlays 27,28 may be a single sheet of overlay material, a cut overlay (where reinforcement cords in the overlay are discontinuous at random locations throughout the tire), or a spiral overlay. The reinforcing cords in the overlay may comprise nylon, polyester, polyamine, aramid, or any other overlay reinforcement material known in the art.

As taught in Luxembourg Patent 85,964, when an overlay is used in a tire, the overlay structure may comprise a ribbon of cable reinforced elastomeric material which is helically wound around the belt structure in a series of at least two helical convolutions. When such a "spiral" overlay is used, preferably adjacent turns of the ribbon will be in an overlapping relationship as taught in commonly owned U.S. patent application Ser. No. 169,561 filed on Mar. 17, 1988.

Figure 3:
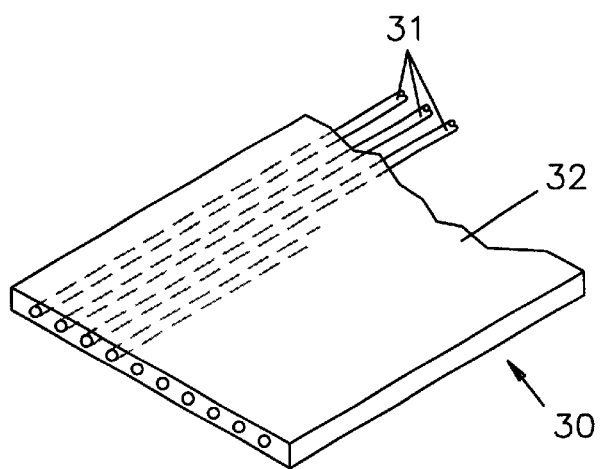
FIG. 3 is a perspective view of a belt composite of the invention.

Referring now to FIG. 3, there is shown a portion of a reinforced composite 30, comprising reinforcement cords 31 of aramid, embedded in a rubber matrix 32. In the illustrated embodiment, the reinforcement cords 31 are yarns of aramid having their component filaments twisted together a given number of turns per unit of length of the yarn (usually expressed in turns per meter, TPM, or in turns per inch, TPI) and the yarns are twisted together to form a cord having a twist multiplier as defined below. Based on the experimental data below, it is believed that the invention will be optimized when the reinforcement cords have a cord distribution density of 10 to 40 EPI, preferably of about 30 EPI, and a linear density of 420 to 1100 dTex, and preferably of about 740 dTex.

The reinforcement cords according to the present invention have a twist of at least 236 TPM (6 TPI) and more preferably of at least 394 TPM (10 TPI). Cords having such twists, have shown suitable durability and the expansion characteristics which permit green tire expansion in the curing mold.

In the present invention, a low-density high strength, experimental aramid provided by DuPont de Nemours Company was used as reinforcement in the belts of the tire.

The low density, experimental material provided by DuPont has Polymer chemistry, processing conditions and finish type essentially the same as that supplied by DuPont in its commercial Kevlar 29 production.

Goodyear testing (ref. Tables 2 & 3) showed that the experimental material has strength and fatigue resistance better than Kevlar 29 (used in tires).

TABLE 1

YARN PROPERTIES

|  | Kevlar 29 (1100 dTex) | EXPERIMENTAL (670 dTex) |
|---|---|---|
| BS, N | 230 | 164 |
| Tenacity, cN/Tex | 196 | 233 |
| LASE @ 1%, N | 58 | 37 |
| LASE @ 2%, N | 125 | 79 |
| LASE @ 3%, N | 200 | 126 |
| EAB, % | 3.3 | 3.8 |
| Modulus, cN/Tex | 5283 | 5327 |

TABLE 2

GREIGE CORD PROPERTIES

|  | Kevlar 29 | EXPERIMENTAL |
|---|---|---|
| Construction | 1100/1/2 | 670/1/2 |
| Twist, tpm | 354Z × 354S | 472Z × 472S |
| TM | 5.5 | 5.7 |
| BS, N | 373 | 272 |
| Tenacity, CN/Tex | 160 | 194 |
| EAB, % | 5.3 | 5.0 |

TABLE 3

DIPPED CORD PROPERTIES

|  | Kevlar 29 | EXPERIMENTAL |
|---|---|---|
| Construction | 1100/1/2 | 670/1/2 |
| Twist, tpm | 354Z × 354S | 472Z × 472S |
| TM | 5.5 | 5.7 |
| BS, N | 342 | 257 |
| Tenacity, cN/Tex | 147 | 184 |
| Inl Modulus, Mpa cN/Tex | 16,690 | 27,420 |
| Dynamic Flex Fatigue, (% ret BS) |  |  |
| *Applied cyclic strain levels |  |  |
| +1.3%/−11.3% | 45 | 73 |
| +1.7%/−15.1% | 21 | 36 |

Goodyear prepared the experimental material for use as tire cord, providing twist to the yarns and the cord, and applying an adhesive. A cord according to the present invention has a twist multiplier of 3 to 9 and preferably of 4 to 7. "Twist multiplier" refers to a number that is an indicator of the helix angle that the yarns in a cord make with respect to a longitudinal axis of a cord. As used herein and in the claims, the twist multiplier of a cord is determined according to the following equation which is well known in the textile art:

$$TM = 0.0137 \, CT \times (CD)^{1/2}$$

wherein TM is the twist multiplier;

CT is the number of turns per inch (2.54 cm) of cord length; and

CD is the sum of the deniers of the yarns, and/or subgroups of the yarns of the cord before any twist is imparted to the yarns or subgroups. The twist multiplier is an important feature of a cord, because it characterizes its physical properties, like tensile strength, modulus, elongation and fatigue. Twist multipliers above 3 characterize cords showing fair elongation properties and excellent tensile strength.

Applying an adhesive to the greige cords of textile material is necessary to achieve an acceptable bond between the cords and the elastomeric matrix, as described by DuPont in product bulletins relating to Kevlar®, e.g. "KEVLAR® SUBCOAT AND TOPCOAT PREPARATION FOR TYPE 950 (TRES) AND TYPE 956 (MECHANICAL RUBBER GOODS)", Geneva, January 1983. Following the teachings of DuPont, for use in the present invention, the aramid yarn, when used without an epoxy pretreatment, may be prepared using two dips; a first dip using IPD 31, IPD 34 or IPD 38 (the IPD numbers are DuPont product identification numbers), and a second dip using IPD 39. If an aramid yarn having an epoxy pretreatment is used, a dip comprising IPD 31 can be used.

Such dipping formulations are well known in the art as illustrated by French patent application 2,671,113-A1.

For a specific reinforcement material, properties in a tire are optimized, for example, by the cord angles, the amount of reinforcement used in ends per inch (e.p.i.), and the number and type of components employed.

In the illustrated tire of the invention, the belt reinforcement was made with a cord density of 35 e.p.i. and a belt angle of 23° (although the inventors believe that, based on properties observed, further optimization will be achieved at a cord density of about 31 e.p.i. when larger cords are used, and optimization of the cord angles will be achieved when the folded belt has cord angles of 19° and the cut belt has cord angles of 35° in a green tire).

Goodyear's lab test results showed that, compared to standard Kevlar 29, the experimental aramid provides: 1) increased tenacity (~20%) and toughness (~50%) and 2) improved dynamic compression fatigue resistance (~20%).

In an illustrated embodiment, a tire of the invention has a cut belt disposed radially outward of a belt having folded portions, the cut belt being reinforced with reinforcement cords extending parallel to one another at a density of 10 to 40 ends per inch (e.p.i.) and making an angle of 15° to 40° with respect to the EP of the tire, and both the cut belt and the folded belt each have reinforcement comprising 420 to 1100 dTex aramid cords having a greige toughness of 30 to 40 Mpa, an initial modulus of 20,000 to 30,000 Mpa, a tenacity of 140 to 200 cN/Tex, wherein the aramid cords are double dipped with an adhesive and provided with a twist of 315 to 551 TPM (8 to 14 TPI), the cords having a fatigue retained break strength of 50 to 100%.

The invention is further illustrated with reference to the following examples:

EXAMPLE 1

Experimental cords were woven into a fabric, and treated by The Goodyear Tire & Rubber Company using two dips of adhesive The experimental cords comprised aramid having a linear density of 670/1/2 dTex, wherein the ply and the cord each had a twist of 472 TPM (12 TPI). The treated fabric had the following properties.

TABLE 4

670/1/2 cord with a 472Z × 472S tpi twist, treated fabric properties

| BS, N | EAB, % | LASE 3%, N |
|---|---|---|
| 267 | 5.2 | 132 |

| Toughness, Mpa | Init Modulus, Mpa | Dyn Flex, % Ret. Break Strength |
|---|---|---|
| 39 | 25,960 | 63 (@ + 1.3%/−11.3%) |
|  |  | 29 (@ + 1.7%/−15.1%) | wherein BS represents break strength, N represents force in Newtons, EAB is elongation at break, Lase 3% is the force in Newtons required to stretch the fabric 3%, toughness is a defined as the arc under the curve when break strength is graphed v. elongation, MPa represents mega pascals, and Dyn Flex is a measure of the strength retained in a cord after a rubber sample in which it is incorporated is cured and cyclic strain tested, and the cord is subsequently removed from the sample.

EXAMPLE 2

This example illustrates the properties a tire is made with the reinforcement of the invention as compared with control tires. Green tires were made with cord angles of 23° in both the cut belt and folded belts. Full width spiral overlays were used on the rear tires, and no overlay was used on the front tires. The cured tires had belt reinforcement angles of about 20°. The green e.p.i. of the belt was 35 and the cured e.p.i. was about 38.

TABLE 5

| SetNo | Engrg Descr | Time of Day | Lap Times: L1–L5 Lap Times: L6–L10 | | | | Driver Coments Tracy |
|---|---|---|---|---|---|---|---|
| 102 | Control | 2:32 p | 64.95 | 61.49 | 60.7 | 61.04 | Loose Entry, Mid-Corner u/s, Exit o/s caused by m-c u/s; Exit o/s gets worse with more laps; Really leaning on the LR |
|  |  |  | 0 | 0 | 0 | 0 |  |
| 302 | 670/2 Flexten Belts | 3:00 p | 63.19 | 62.49 | 60.57 | 0 | Came in very fast; Great grip, much better everywhere, much more stable; slight m-c u/s and exit o/s, but much better; Much better than the control. |
|  |  |  | 0 | 0 | 0 | 0 |  |
| 303 | Control | 3:10 p | 63.22 | 62.71 | 60.85 | 0 | A ton less grip than previous set; More u/s at m-c, more exit o/s; Car is sliding a lot more; Front tires chatter in the chicane; spun on lap 4 at Turn 4 |
|  |  |  | 0 | 0 | 0 | 0 |  |

TABLE 6

| SetNo | Engrg Descr | Time of Day | Lap Times: L1–L5 Lap Times: L6–L10 | | | | Driver Comments Andretti |
|---|---|---|---|---|---|---|---|
| 600 | Control | 1:30 p | 72.13 | 68.99 | 69.15 | 69.12 | Tires came in quick and were consistent. No difference between front and rear. General car balance was u/s in slow speed turns and neutral in high-speed turns. |
|  |  |  | 0 | 0 | 0 | 0 |  |
| 605 | 670/2 flexten belts ipo 10000/2 | 2:35 p | 70.85 | 68.53 | 68.18 | 68.47 | More o/a grip. Same balance and consistency as the control. Good entry. Good power down. RH change due to softer spring rate. |
|  |  |  | 0 | 0 | 0 | 0 |  |

The embodiments of the invention described above should be considered as illustrative and not as limiting the scope of the invention as defined in the following claims.

What is claimed is:

1. A pneumatic automobile tire having an aspect ratio below 65, comprising at least one radial ply carcass, a tread disposed radially outward of the crown region of the carcass, a belt assembly having an overall width substantially equal to the tread width (TW) interposed between the tread and the crown region in circumferential surrounding relation to the carcass, wherein the belt assembly comprises a belt having folded portions on each lateral side, being reinforced with reinforcement cords extending parallel to one another and making an angle of 15° to 40° with respect to the equatorial plane (EP) of the tire, the axially outer portions of the ply being folded in a radially outward direction;

at least one cut belt disposed radially outward of said belt having folded portions, said at least one cut belt being reinforced with reinforcement cords extending parallel to one another at a density of 10 to 40 ends per inch (e.p.i.) and making an angle of 15° to 40° with respect to the equatorial plane of the tire, each said belt having reinforcement cords being 420 to 1100 dTex aramid cords having a greige toughness of 30 to 40 MPa, an initial modulus of 20,000 to 30,000 MPa, and a tenacity of 140 to 200 cN/Tex, wherein said aramid cords are double dipped with an adhesive and provided with a twist of 315 to 551 turns per meter (TPM) (8 to 14 turns per inch (TPI)) said cords having a dynamic flex fatigue retained break strength of 50 to 100%.

2. A pneumatic tire according to claim 1 wherein the cord reinforcement in both the at least one cut belt and the folded belt has a cured cord angle of about 20° with respect to the equatorial plane of the tire.

3. The pneumatic tire of claim 2 wherein all of the belts have a cord density of about 38 ends per inch.

4. A pneumatic tire according to claim 1 wherein the folded portions each have a transverse width equal to 5% to 30% of the tread width (TW).

* * * * *